Dec. 10, 1940.    A. KARSIKAS    2,224,515
HANDLE BAR STEM FOR BICYCLES AND THE LIKE
Filed Feb. 9, 1939
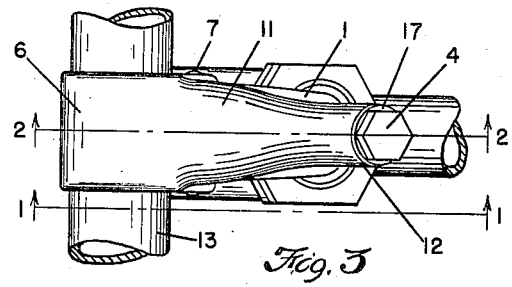
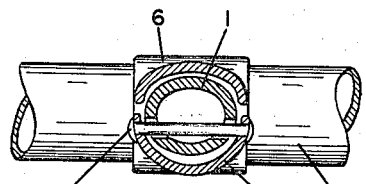
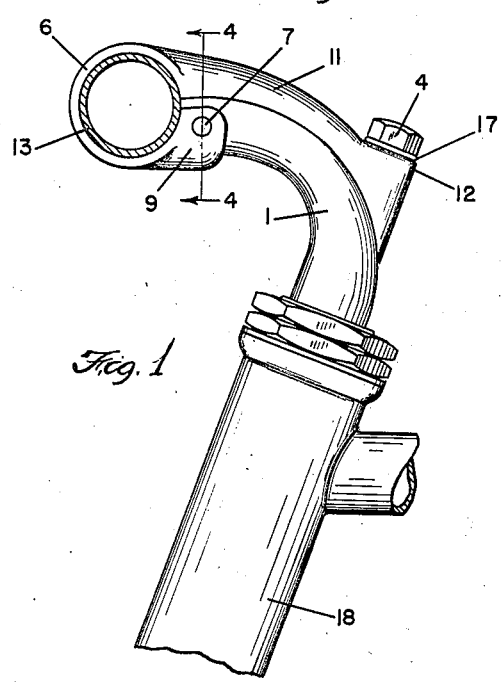
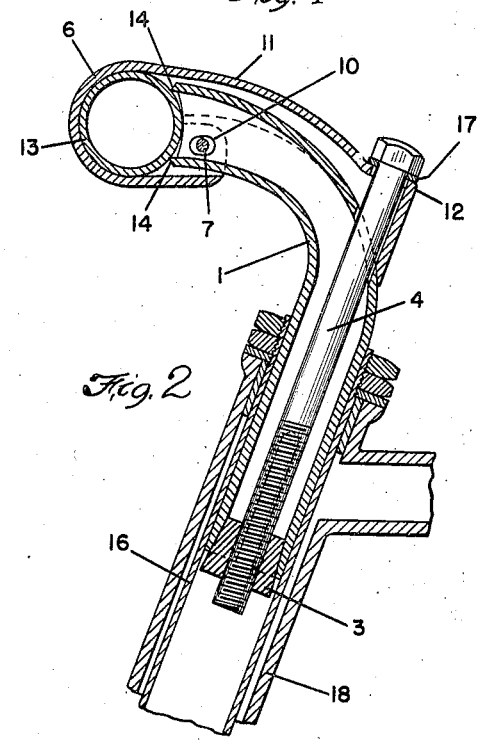
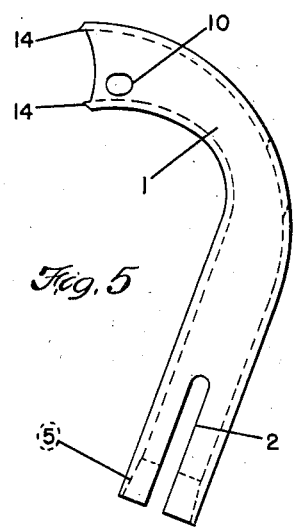
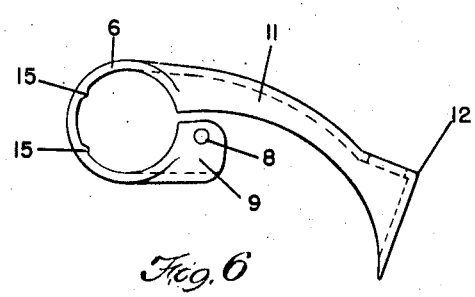
INVENTOR.
ARVID KARSIKAS
BY Oberlin, Limbach & Day
ATTORNEYS Patented Dec. 10, 1940

2,224,515

UNITED STATES PATENT OFFICE 2,224,515

HANDLE BAR STEM FOR BICYCLES AND THE LIKE

Arvid Karsikas, Ashtabula, Ohio, assignor to The Ashtabula Bow Socket Company, Ashtabula, Ohio, a corporation of Ohio Application February 9, 1939, Serial No. 255,474

10 Claims. (Cl. 287—54)

This invention relates, as indicated, to handle bar stems and the like and more particularly to a new and improved clamping means for holding the handle bars in any desired position.

Handle bar stems have in the past been made in the form of forgings, malleable castings, die castings and similar more or less expensive products which have not always been satisfactory for the purpose. It is very desirable that the handle bars may be firmly locked in the stem so as to resist turning therein and also that the stem be strongly secured to the steering post of the bicycle. The parts themselves should, of course, be of such construction that they will withstand such hard usage as they are likely to encounter.

It is, therefore, a principal object of this invention to provide a handle bar stem of novel construction which is inexpensive to produce yet unusually efficient in fulfilling its functions.

Another object is the provision of such a stem wherein the movable portion of the handle bar clamping means may be a stamping.

A further object is to provide a stem wherein the clamping of the handle bar and the securing of the stem to the steering post may be effected by the manipulation of but one bolt.

Other objects will appear as the description proceeds.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of various structural forms in which the principle of the invention may be used.

In said annexed drawing:

Fig. 1 is a side elevational view of my new handle bar stem showing a portion of the bicycle frame and with the handle bar in cross-section.

Fig. 2 is a vertical sectional view of the same members along the line 2—2 indicated on Fig. 3.

Fig. 3 is a top view of my new stem as shown in Fig. 1 with a broken section of the handle bar shown in place.

Fig. 4 is a cross sectional view along the line 4—4 as shown on Fig. 1.

Fig. 5 is a side elevational view of the tubular portion of my stem showing the slotted extremity for insertion in the steering post and the pivot hole for attachment of the movable portion of the handle bar clamping means.

Fig. 6 is a side elevational view of said movable clamping means.

The invention comprises a bent tubular stem with a split transverse sleeve attached to an end thereof by one tongue of said sleeve, the other tongue of said sleeve extending along said tubular stem and adpressable thereto.

More particularly, my new stem comprises a handle bar clamping means adapted to tightly draw the handle bar against the extremity of said stem and hold it so gripped when the bolt employed to attach said stem to the steering post is tightened.

Referring now more specifically to the drawing and especially to Figs. 1, 2 and 5, an embodiment of my new handle bar stem comprises a bent tubular portion 1 with two or more slots 2 in its lower end to facilitate the expansion of this extremity when the conical or tapered plug 3 is drawn into clamping position by the bolt 4 which enters the tubular portion of the stem at the point where it is bent. The inner edge 5 of said lower end may be tapered as shown in Fig. 5 to facilitate the movement of the plug 3.

A split transverse sleeve 6 which may be formed by a stamping operation is attached to the upper end of said tubular portion by means of a pin 7 which passes through holes 8 in flanges 9 of the lower tongue of said sleeve and holes 10 in said tubular portion, such last-named holes preferably being extended to form short slots as shown permitting a certain amount of play to the pin 7. The ends of said pin are swaged down to hold it in place. The upper tongue 11 of the sleeve 6 extends along the curved upper surface of the tubular portion of the stem and is provided with a shoulder 12 through which the bolt 4 is drifted and on which the head bears. Thus, when the bolt is tightened, a force is longitudinally exerted on the tongue 11 causing the sleeve 6 to draw the handle bar 13 therein inserted into gripping contact with the end of the tubular portion of the stem which may be provided with teeth or jaws 14. The sleeve may itself be provided with low teeth or ridges 15 as shown in Fig. 6 to aid in gripping the bar.

It will, therefore, be seen that the handle bar may be locked in place and the lower extremity of the stem proper at the same time distended so as to firmly secure the stem in the steering post 16 by simply tightening the single bolt 4, with which a lock washer 17 may advantageously be employed. Not only is a superior assembly obtained but, as above indicated, the movable clamping member may be formed by a simple stamping operation and but a single bolt is required for both locking operations, resulting in a relatively low cost of construction. The tubular head frame 18 as shown in Figs. 1 and 2 is of the conventional type.

As may clearly be seen, this invention may be adapted to various uses such as handle bar stems for velocipedes and the like without departing in any way from the spirit of this invention.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A clamping stem for bicycle handle bars and the like, comprising a hollow curved tubular portion a one-piece split sleeve member attached to one extremity thereof by one tongue of said sleeve, the other tongue of said sleeve extending along the upper curved surface of said tubular portion and a bolt to attach said stem to a steering post, said other tongue being adpressable to said curved surface by means of the same bolt employed to attach said stem to the steering post, said tongues having portions thereof extending in substantially parallel planes.

2. A clamping stem for bicycle handle bars and the like, comprising a curved tubular portion and a one-piece split transverse sleeve member pivotally attached to one extremity thereof by one tongue of said sleeve, the other tongue of said sleeve extending along the upper curved surface of said tubular portion and a bolt to attach said stem to a steering post, adpressable to said curved surface by means of the same bolt employed to attach said stem to the steering post.

3. A clamping stem for bicycle handle bars and the like, comprising a curved tubular portion slotted at one extremity, a one-piece split transverse sleeve pivotally attached to the other extremity of said tubular portion by one tongue of said sleeve, the other tongue of said sleeve extending along the upper curved surface of said tubular portion and adpressable thereto by means of a bolt passing through said last-named tongue and extending through said tubular portion to said slotted extremity of said tubular portion where it is threaded into an upwardly tapered plug the largest diameter of which is greater than the inner diameter of said slotted tubular portion.

4. A clamp for bicycle handle bars and the like, comprising a tubular stem and a one-piece split transverse sleeve, said sleeve having an upper and lower tongue and being attached to an end of said tubular stem by said lower tongue, the upper tongue of said sleeve extending along the upper surface of said tubular stem and adpressable thereto, said upper and lower tongues extending in a direction parallel to the axis of said stem.

5. A clamp for bicycle handle bars and the like, comprising a tubular stem and a split transverse sleeve having two tongues one tongue of which is attached to an end of said tubular stem by means of a sliding pivot, the other tongue of said sleeve extending along a surface of said tubular stem above said pivot and adpressable thereto.

6. A clamp for a bicycle handle bar and the like comprising a semi-circular portion adapted to contact said handle bar, a lower tongue integral with said semi-circular portion, and an upper tongue integral with said semi-circular portion both of said tongues extending rearwardly from said semi-circular portion, said upper tongue being materially longer than said lower tongue, both of said tongues having portions extending tangentially with respect to said semi-circular portion said upper and lower tongues being arcuate in cross section and being adapted to embrace a tubular stem.

7. A clamp for a bicycle handle bar and the like comprising a semi-circular portion adapted to contact said handle bar, a lower tongue integral with said semi-circular portion, and an upper tongue integral with said semi-circular portion both of said tongues extending rearwardly from said semi-circular portion, said upper tongue being materially longer than said lower tongue, and having an aperture therein for the reception of a steering post bolt, both of said tongues having portions extending tangentially with respect to said semi-circular portion said upper and lower tongues being arcuate in cross section and being adapted to embrace a tubular stem.

8. A clamp for a bicycle handle bar and the like comprising a semi-circular portion adapted to contact said handle bar, a lower tongue integral with said semi-circular portion, and an upper tongue integral with said semi-circular portion both of said tongues extending rearwardly from said semi-circular portion, said upper tongue being materially longer than said lower tongue, and having an aperture therein for the reception of a steering post bolt, said lower tongue having mating apertures for the reception of a pivot pin.

9. A clamp for a bicycle handle bar and the like comprising a semi-circular portion adapted to contact said handle bar, a lower tongue integral with said semi-circular portion, and an upper tongue integral with said semi-circular portion both of said tongues extending rearwardly from said semi-circular portion, said upper tongue being materially longer than said lower tongue, and having an aperture therein for the reception of a steering post bolt, said lower tongue having upwardly extending mating flanges and alined apertures therein for the reception of a pivot pin.

10. A clamp for a bicycle handle bar and the like comprising a semi-circular portion adapted to contact said handle bar, a lower tongue integral with said semi-circular portion, and an upper tongue integral with said semi-circular portion both of said tongues extending rearwardly from said semi-circular portion, both of said tongues having a pair of flanges with portions thereof adapted to engage said handle bar, one pair of such flanges extending toward the other pair.

ARVID KARSIKAS.